United States Patent
Weng et al.

(10) Patent No.: US 6,496,012 B1
(45) Date of Patent: Dec. 17, 2002

(54) APPARATUS AND METHOD FOR DETECTING A SHORT CIRCUIT IN A LIGHTING SYSTEM

(75) Inventors: Da Feng Weng, Yorktown Heights, NY (US); Chin Chang, Yorktown Heights, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 34 days.

(21) Appl. No.: 09/667,450

(22) Filed: Sep. 22, 2000

(51) Int. Cl.[7] ............................................. G01R 31/08
(52) U.S. Cl. .......................... 324/521; 324/510; 361/47
(58) Field of Search ................................. 324/521, 510; 315/279; 361/47

(56) References Cited

U.S. PATENT DOCUMENTS 4,228,475 A * 10/1980 Sherwood ................... 324/510
5,965,989 A    10/1999 Mader ........................ 315/279

* cited by examiner

*Primary Examiner*—N. Le
*Assistant Examiner*—Amy He

(57) ABSTRACT

An apparatus and method for detecting a short in a load which receives power from a transformer having a primary winding and a secondary winding with the load being connected to the secondary winding. The apparatus has a waveform conversion circuit, a phase detector circuit and a filter. The waveform conversion circuit converts voltage and current signals that represent the voltage and current, respectively, of the primary winding into generally squarewave voltage and current signals, respectively. The phase detector circuit outputs a control signal having a first state when the generally squarewave voltage and current signals are substantially in phase and a second state when there is a difference in phase between the generally squarewave voltage and current signals that is greater than a predetermined phase difference. The filter filters the control signal outputted to the phase detector circuit.

15 Claims, 4 Drawing Sheets

APPARATUS AND METHOD FOR DETECTING A SHORT CIRCUIT IN A LIGHTING SYSTEM

BACKGROUND OF THE INVENTION

1. Field of the Invention

The present invention generally relates to an apparatus for detecting a short circuit in a load that is connected to a secondary winding of a transformer.

2. Problem to be Solved

Resonant transformers are typically used in lighting systems. Resonant transformers usually have a relatively high turn ratio. As a result of this high turn ratio, the impedance of the leakage inductor between the primary winding and the secondary winding is relatively high. When a switching frequency is applied to the transformer that is relatively higher than the resonant frequency (inductive mode), the impedance of the leakage inductor is generally the same as the impedance of the transformer's output load. Due to the high impedance of the leakage inductor, the primary current of the transformer will not increase much more even if the output load is shorted. The conventional technique of detecting the amplitude of the primary current cannot determine if the output load is shorted.

It is therefore an object of the present invention to provide a unique apparatus and method for detecting a short circuit in a load connected to the secondary winding of a transformer.

Other objects and advantages of the present invention will be apparent to one of ordinary skill in the art in light of the ensuing description of the present invention.

SUMMARY OF THE INVENTION

In one aspect, the present invention is directed to an apparatus for detecting a short in a load which receives power from a transformer wherein the transformer has a primary winding and a secondary winding and wherein the load is connected to the secondary winding. The apparatus comprises a waveform conversion circuit for converting voltage and current signals representing the transformer primary winding voltage and current signals, respectively, into generally squarewave voltage and current signals, respectively. The apparatus further comprises a phase detector circuit for outputting a control signal having a first state when the generally squarewave voltage and current signals are substantially in phase and a second state when there is in a difference in phase between the generally squarewave voltage and current signals that is greater than a predetermined phase difference. The apparatus further comprises a filter for filtering the signal outputted by the phase detector circuit. In one embodiment, the apparatus further comprises a circuit for deactivating the load when the control signal has the second state. In one embodiment, the apparatus included means for indicating that a short exists in the load when the control signal has the first state.

In a related aspect, the present invention is directed to an apparatus for detecting a short in a lighting system which receives power from a transformer wherein the transformer has a primary winding and a secondary winding and wherein the lighting system is connected to the secondary winding. The apparatus comprises means for converting voltage and current signals representing the transformer primary voltage and current signals, respectively, into generally squarewave voltage and current signals, respectively, means for generating a signal having a first state when the generally squarewave voltage and current signals are substantially in phase and a second state when there is in a difference in phase between the generally squarewave voltage and current signals that is greater than a predetermined phase difference, and means for filtering the signal outputted by the phase detector circuit.

In yet a further aspect, the present invention is directed to a method for detecting a short in a load that receives power from a transformer that has a primary winding and secondary winding wherein the load is connected to the secondary winding. The method comprises the steps of providing voltage and current signals that represent the transformer primary voltage and current signals, respectively, converting the signals that represent the transformer primary voltage and current signals into generally squarewave voltage and current signals, respectively, generating a signal having a first state when the generally squarewave voltage and current signals are substantially in phase and a second state when there is in a difference in phase between the generally squarewave voltage and current signals that is greater than a predetermined phase difference, and filtering the signal outputted by the phase detector circuit.

BRIEF DESCRIPTION OF THE DRAWINGS

The features of the invention are believed to be novel and the elements characteristic of the invention are set forth with particularity in the appended claims. The invention itself, both as to organization and method of operation, may best be understood by reference to the detailed description which follows taken in conjunction with the accompanying drawings in which:

DETAILED DESCRIPTION OF THE INVENTION

Figure 1:
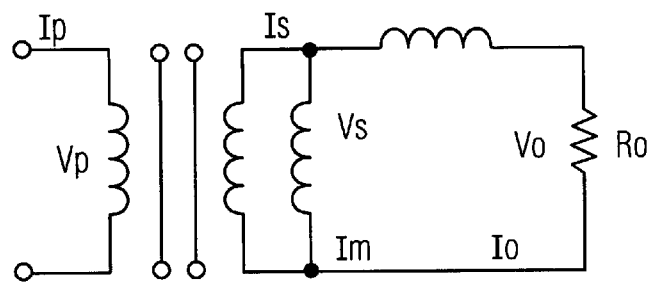
FIG. 1 is a schematic diagram of a transformer.

In order to facilitate an understanding of the present invention, the ensuing description pertains to the basic operational theory of resonant transformers. Referring to FIG. 1, there is shown an equivalent circuit of a resonant transformer. When a relatively high working frequency is applied to a resonant circuit, the transformer primary winding current $I_P$ and primary winding voltage $V_P$ can be detected without difficulty. The transformer primary voltage $V_P$ increases with the transformer secondary voltage $V_S$. Similarly, the transformer primary current $I_P$ increases with the transformer secondary current $I_S$. The transformer primary voltage $V_P$ and current $I_P$ include the amplitude and phase information. The phase of voltage $V_P$ is substantially the same as the phase of voltage $V_S$. Similarly, the phase of current $I_P$ is substantially the same as the phase of current $I_S$. The load voltage $V_O$, current $I_O$, and resistance $R_O$ are represented by, respectively. The transformer magnetizing current $I_M$ is represented by and is typically very low.

Figure 2:
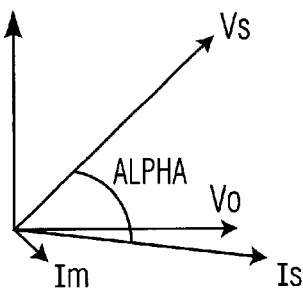
FIG. 2 is a phase diagram of a transformer's voltage and current for normal operation.
Figure 3:
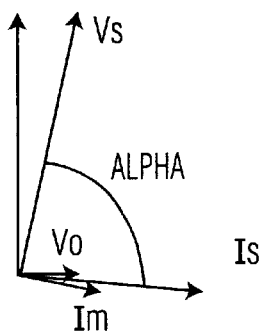
FIG. 3 is a phase diagram of a transformer's voltage and current when a short circuit exists.

Referring to FIG. 2, there is shown a phase diagram of the transformer's voltage and current for normal operation. In view of the foregoing discussion, the voltage $V_S$ represents the voltage $V_P$ and the current $I_S$ represents current $I_P$. Under normal operation, the phase angle Alpha between the voltage $V_S$ and the current $I_S$ is less than fifty degrees. Referring to FIG. 3, there is shown the phase diagram of the transformer's voltage $V_S$ and current $I_S$ for short circuit operation, i.e. the transformer output is shorted. It has been found that, as a result of the short circuit, the phase angle Alpha between the voltage $V_S$ and the current Is is greater than seventy degrees. Therefore, in accordance with the present invention, the phase angle between the voltage Vs and the current Is is measured to determine if the output of the transformer is shorted. This is accomplished by measuring the phase angle between the voltage $V_P$ and the current $I_P$ since, as described in the foregoing discussion, the phase of voltage $V_P$ and current $I_P$ is substantially the same as $V_S$ and current $I_S$, respectively.

Figure 4:
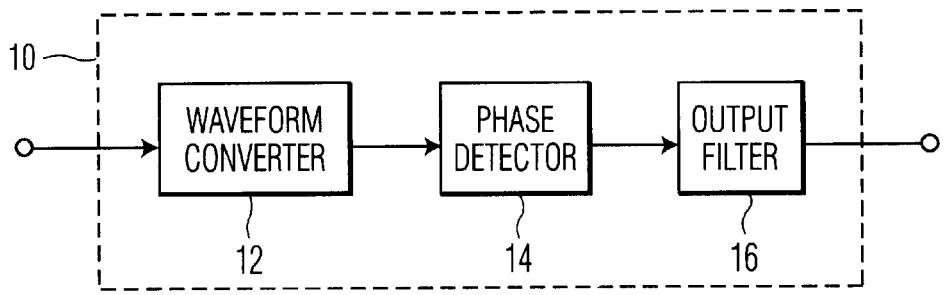
FIG. 4 is a block diagram of the apparatus of the present invention.

Referring to FIG. 4, there is shown a block diagram of apparatus 10 of the present invention. Although the ensuing description is in terms of apparatus 10 being used with lighting systems, it is to be understood that apparatus 10 can be used with any type of load that receives power from a resonant transformer. Apparatus 10 generally comprises waveform conversion circuit 12, phase detection circuit 14 and output filter 16. The transformer primary voltage $V_P$ and current $I_P$ waveforms, respectively, are inputted into waveform conversion circuit 12. Waveform circuit 12 shapes these waveforms into squarewave signals. These shaped waveforms are inputted into phase detector circuit 14. Phase detector circuit 14 detects the phase difference between the voltage and current squarewave signals outputted by circuit 12 and outputs a signal having a first state (e.g. TTL logic level "LOW") if the voltage and current squarewave signals are substantially in phase and a second state (e.g. TTL logic level "HIGH") if the difference in phase between the voltage and current squarewave signals exceeds a predetermined phase difference. A short in the load exists when the difference in phase between the voltage and current squarewave signals exceeds the predetermined phase difference. In one embodiment, the predetermined phase difference is 50 degrees. In another embodiment, the predetermined phase difference is 70 degrees. If the difference in phase between the voltage and current squarewave signals does not exceed the predetermined phase difference, then no short exists in the load.

Referring to FIG. 4, the output of phase detector circuit 14 is inputted into filter circuit 16 which removes any A.C. (Alternating Current) ripple, voltage spikes or other transient signals. The output of filter circuit 16 is then inputted into a control circuit (not shown). If the voltage outputted by filter circuit 16 is above a predetermined level, the control circuit (not shown) deactivates the load to which the transformer secondary winding is connected. For example, if the signal outputted by filter circuit 16 is a logic level ("1"), then the control circuit (not shown) deactivates the load.

Figure 5:
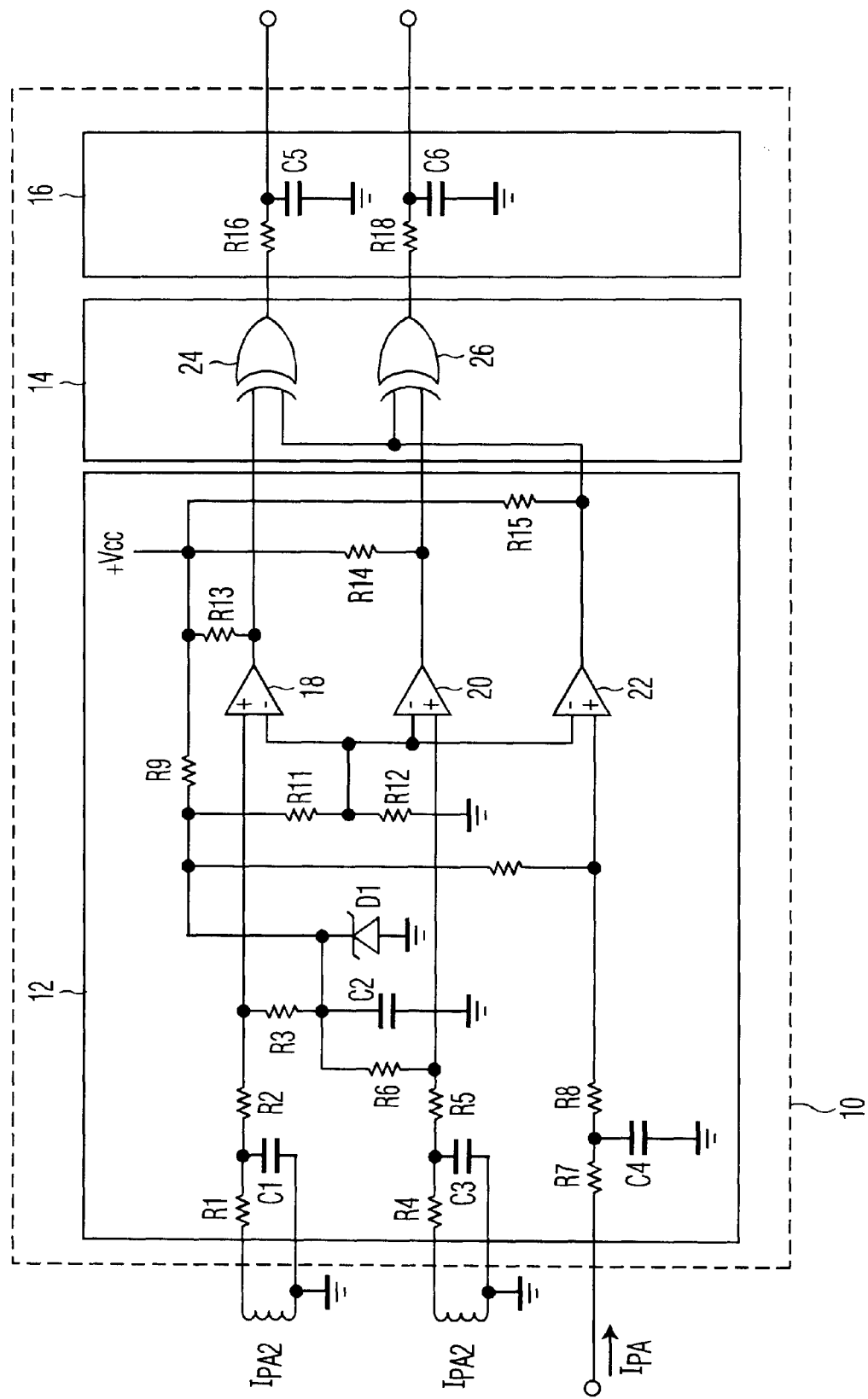
FIG. 5 is a circuit diagram of one embodiment of the apparatus of FIG. 4.

Referring to FIG. 5, there is shown on embodiment of apparatus 10 of the present invention. In this particular embodiment, apparatus 10 is configured to detect short circuits for two transformers in series wherein each transformer is associated with a corresponding lamp. However, it is to be understood that the circuit of FIG. 5 can be used with one lamp or more than two lamps. Waveform conversion circuit 12 generally comprises input signal circuitry for receiving the transformer primary voltage waveforms associated with the pair of lamps and for receiving the transformer primary current waveform. Circuit 12 includes resistors R1 and R2 and capacitor C1 which are configured as a "T" network. One end of the resistor R1 is connected to a transformer primary auxiliary winding portion $T_{PA1}$ to receive voltage $V_{PA1}$ which is in phase with voltage $V_p$. The other end of resistor R1 is connected to one end of the resistor R2 and capacitor C1. The primary auxiliary winding portion $T_{PA1}$ corresponds to the transformer second winding voltage which is applied to a first lighting system or lamp. The other end of capacitor C1 is connected to a ground potential. In one embodiment, resistor R1 has a resistor of 10 kΩ and resistor R2 has a resistor of 100 kΩ. In one embodiment, capacitor C1 has a capacitance of 100 pf (picofarads). Circuit 12 further includes resistors R3, capacitor C1, and Zener diode D1. One end of the resistor R3 is connected one end of capacitor C2 and the anode of Zener diode D1. The other end of capacitor C2 is connected to a ground potential. In one embodiment, resistor R3 has a resistor of 100 kΩ. Capacitor C2 functions as a bypass capacitor and prevents A.C. signals from being applied to Zener diode D1 and in one embodiment, has a capacitance of 0.01 uf (microfarads). In on embodiment, the Zener diode D1 is about 3.3 volts. Resistor R3 and Zener diode D1 provide a D.C. offset voltage for the voltage signal $V_{PA1}$.

Referring to FIG. 5, waveform conversion circuit 12 further includes resistors R4 and R5 and capacitor C3 which are configured in a "T" network. One end of resistor R4 is connected to transformer primary auxiliary winding portion $T_{PA2}$ to receive voltage $V_{PA2}$ which is in phase with voltage $V_p$. The other end of resistor R4 is connected to one end of resistor R5 and capacitor C3. Voltage $V_{PA2}$ is applied to a second lighting system or lamp. The other end of capacitor C3 is connected to ground potential. In one embodiment, resistor R4 has a resistance of 10KΩ and resistor R5 has a resistance of 100KΩ. In one embodiment, capacitor C3 has a capacitance of 100 pf (picofarads). Circuit 12 further includes resistor R6. Resistor R6 is connected between resistor R5 and Zener diode D1. In one embodiment, resistor R6 has a resistance of 100KΩ. Resistor R6 and Zener diode D1 cooperate to provide a D.C. offset voltage for voltage signal $V_{PA2}$.

Referring to FIG. 5, circuit 12 further includes resistors R7 and R8 and capacitor C4 which are arranged in a "T" network. In one embodiment, resistors R7 and R8 have resistances of 10KΩ and 100KΩ, respectively. In one embodiment, capacitor C4 has a capacitance of about 100 pf. The current flowing through the transformer secondary winding is inputted into one end of resistor R7. Resistor R10 and Zener diode D1 cooperate to provide a D.C. offset for current $I_{PA}$ which flows through transformer auxiliary winding portions $T_{PA1}$ and $T_{PA2}$. The current IPA is inputted into comparator 22.

Referring to FIG. 5, waveform converter circuit 12 further comprises resistors R9, R10, R11, R12, R14 and R15, and comparators 18, 20 and 22. Resistor R9 is connected between supply voltage +Vcc and the anode of Zener diode D1. In one embodiment, supply voltage +Vcc is about 5.0 volts D.C. Resistor R10 is connected between resistor R8 and the anode of Zener diode D1. Resistor R10 is also connected to the non-inverting input of comparator 22. Resistors R11 and R12 are configured in a voltage divider circuit. Resistor R11 is connected between the anode of Zener diode D1 and one end resistor R12. The other end of resistor R12 is connected to ground potential. The junction of resistors R11 and R12 is connected and provides a bias voltage to the inverting inputs of comparators 18, 20 and 22. The junction of resistors R2 and R3 is connected to the non-inverting input of comparator 18. The junction of resistors R5 and R6 is connected to the non-inverting input of comparator 20. Resistors R13, R14 and R15 function as pull-up resistors and are connected between +Vcc and the outputs of comparators 18, 20 and 22, respectively. In one embodiment, resistor R10 has a resistance of 100KΩ. In one embodiment, each resistor R9, R11, R12, R13, R14 and R15 has a resistance of 10KΩ.

Referring to FIG. 5, phase detector 14 generally comprises XOR (Exclusive OR) gates 24 and 26. One input of gate 24 is connected to the output of comparator 18. The other input of gate 24 is connected to the output of comparator 22. One input of gate 26 is connected to the output of comparator 20. The other input of gate 26 is connected to the output of comparator 22. The outputs of gates 24 and 26 are inputted into output filter circuit 16.

Referring to FIG. 5, filter circuit 16 generally comprises two R-C type filter circuits. Each R-C filter circuit receives an output from a respective XOR gate. One filter circuit comprises resistor R16 and capacitor C5. The output of XOR gate 24 is connected to resistor R16. The other filter circuit comprises resistor R18 and capacitor C6. The output of XOR gate 26 is connected to resistor R18. In one embodiment, each resistor R16 and R18 has a resistance of 100KΩ. In one embodiment, each capacitor C5 and C6 has a capacitance of 0.1 uf. The R-C filter circuits smooth out the output of the XOR gates 24 and 26 and filter out any AC ripple, ringing or transient spikes.

Operation

Referring to FIG. 5, voltage $V_{PA1}$ inputted into waveform converter circuit 12. Specifically, voltage $V_{PA1}$ is inputted into the input circuit comprising resistors R1 and R2 and capacitor C1. As described in the foregoing description, resistors R1 and R3 and Zener diode D1 provides a D.C. offset voltage for the voltage $V_{PA1}$. Voltage $V_{PA1}$ and the offset voltage are then inputted into the non-inverting input of comparator 18. Similarly, voltage $V_{PA2}$ is inputted into waveform converter circuit 12. Specifically, voltage $V_{PA2}$ is inputted into the input circuit comprising resistors R4 and R5 and capacitor C3.

Referring to FIG. 5, the current $I_{PA}$ is inputted into waveform converter circuit 12 at resistor R7. The voltages $V_{PA1}$ and $V_{PA2}$ and current $I_{PA}$ are in the form of sinusoidal waveforms. As will be explained below, comparators 18, 20 and 22 convert the sinusoidal waveforms into generally squarewave signal waveforms. Voltage $V_{PA1}$, which is associated with the first lamp, is inputted into the non-inverting input of comparator 18. The output of comparator 18 is inputted into phase detector circuit 14. Specifically, the output of comparator 18 is inputted into one input of XOR gate 24. The current waveform $I_{PA}$ is outputted by comparator 22 and is inputted into the second input of XOR gate 24.

Figure 6:
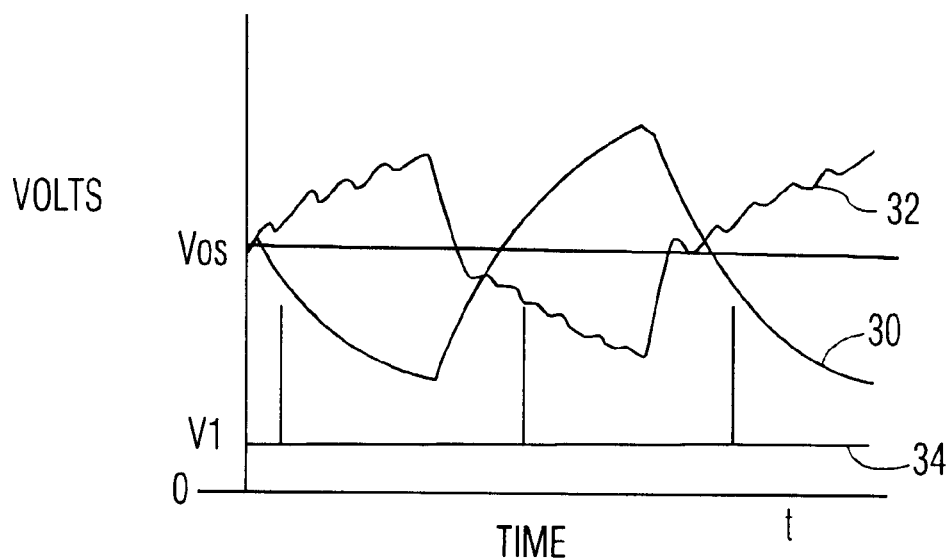
FIG. 6 illustrates the signal waveforms outputted by a waveform converter circuit and phase detector circuit shown in FIG. 4 during normal operation.
Figure 7:
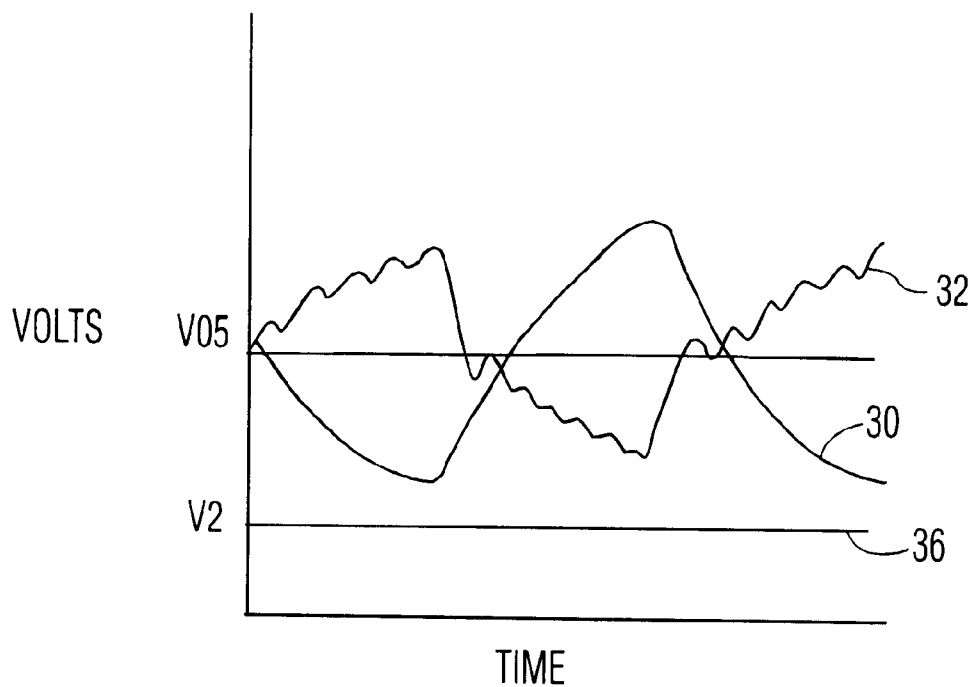
FIG. 7 illustrates the signal waveforms outputted by the waveform converter circuit and a filter circuit shown in FIG. 4 during normal operation.

Referring to FIG. 6, waveforms 30 and 32 are the $I_{PA}$ and $V_{PA1}$ waveforms, respectively, that are outputted from comparators 18 and 22, respectively, during normal conditions (i.e. no short). Waveforms 30 and 32 have an offset voltage $V_{OS}$. Waveforms 30 and 32 are inputted into XOR gate 24. Waveform 34 is the output of XOR gate 24. Since the $I_{PA}$ and $V_{PA1}$ waveforms are in phase, waveform 34 is generally at TTL logic level "LOW" indicated by voltage $V_1$. The output of XOR gate 24 is inputted into the R-C filter circuit comprising resistor R16 and capacitor C5. Referring to FIG. 7, waveform 36 is outputted by this R-C filter circuit and is at a TTL logic level "LOW" level indicated by voltage $V_2$ which, in one embodiment, is between about 0.1 and 0.2 volts.

Figure 8:
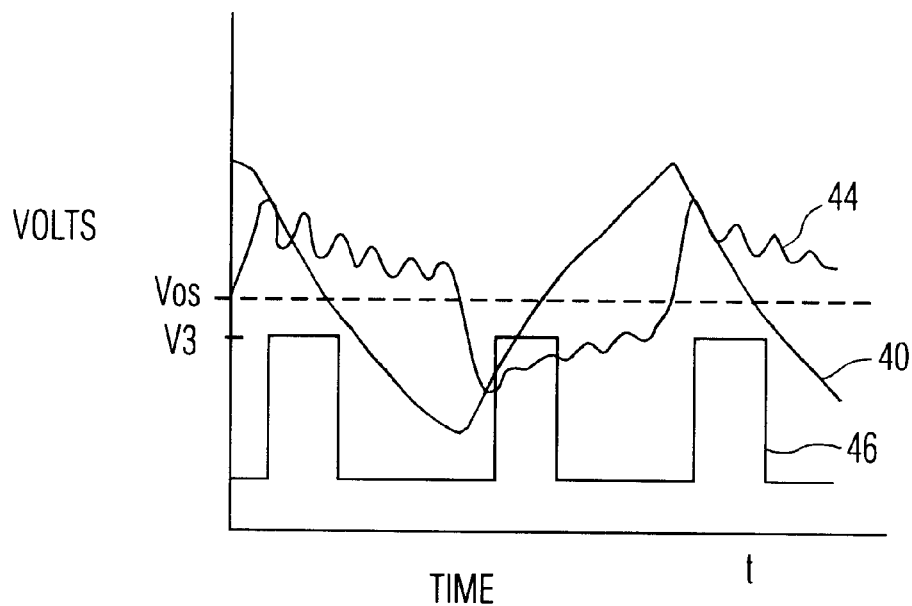
FIG. 8 illustrates the signal waveforms outputted by the waveform converter circuit and the phase detector circuit shown in FIG. 4 during short circuit conditions.
Figure 9:
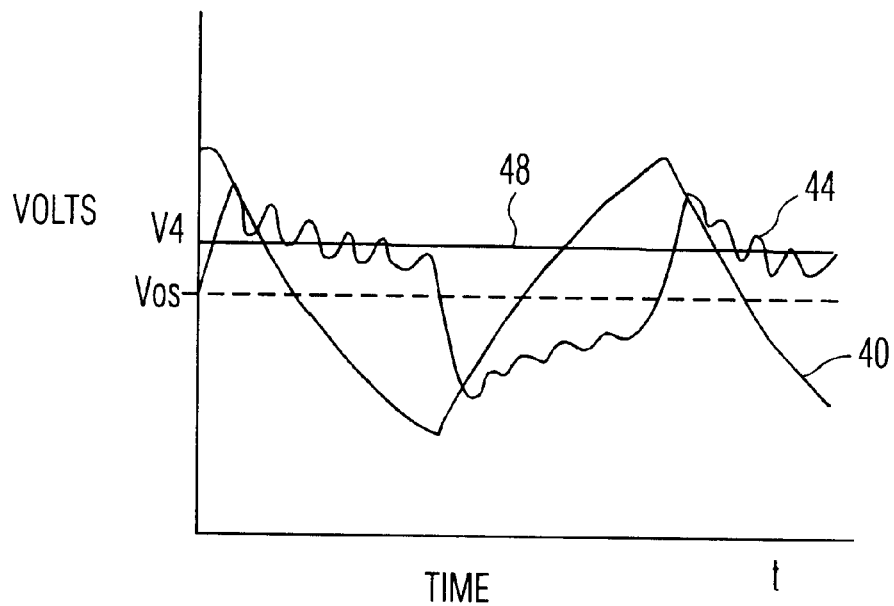
FIG. 9 illustrates the signal waveforms outputted by the waveform converter circuit and the filter circuit shown in FIG. 4 during short circuit conditions.

Referring to FIG. 8, waveforms 40 and 44 are current signal $I_S$ and voltage $V_{PA1}$ when the first lamp is shorted. Waveforms 40 and 44 are outputted from comparators 18 and 22, respectively, and are inputted into XOR gate 24. Since there is a significant phase difference between waveforms 40 and 44, XOR gate 24 outputs waveform 46 which has a TTL "HIGH" level that is indicated by voltage $V_3$. Waveform 46 is then inputted into the R-C filter circuit comprising resistor R16 and capacitor C5. This R-C filter circuit outputs waveform 48 shown in FIG. 9. Waveform 48 is generally a D.C. voltage $V_4$ that is at a TTL "HIGH" level of about 3.3 volts.

Referring to FIG. 5, it is to be understood that due to the symmetry of the circuit design used to realize apparatus 10, the phase difference between current $I_{PA}$ and voltage signal $V_{PA2}$ is detected in the same manner via comparators 20 and 22, XOR gate 26 and the R-C filter comprising resistor R18 and capacitor C6. Thus, the aforementioned R-C filter circuit outputs a waveform similar to waveform 36 when the second lamp is not shorted, and a waveform similar to waveform 48 when the second lamp is shorted.

The waveforms outputted by the R-C filter comprising resistor R16 and capacitor C5 and the R-C filter comprising resistor R18 and capacitor C6 can be inputted into control circuitry (not shown) that deactivates either or both lamps if a short develops in either or both lamps.

Since the voltage swing of the output of the R-C filter circuits is relatively large, each R-C filter may be configured to have a relatively low time constant even if the output ripple of the filter is high. The relatively low time constant also allows apparatus 10 to detect short circuits in a deep-dimming configuration which typically uses relatively low, duty-cycle PWM (pulse-width-modulation).

An important advantage of apparatus of the present invention is that the per-unit cost of system 10 is relatively low because it is not necessary for apparatus 10 to detect the amplitude of the transformer's voltage and current, or circuit parameters such as leakage inductance Ls and coupling coefficients.

Although FIG. 5 shows a circuit configured for use with two lamps, it is to be understood that the present invention can be used for one lamp or more than two lamps. Furthermore, the component values (i.e. resistances and capacitances) for the resistors and capacitors described above are just examples of suitable component values. It is to be understood that other suitable component values can also be used. Furthermore, although the comparators shown in FIG. 5 are configured to operate with a single power source +Vcc, it is to be understood that the comparators can be configured to operate with two power sources.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

Thus, having described the invention, what is claimed is:

1. An apparatus for detecting a short in a load which receives power from a transformer having a primary winding and a second winding, the load being connected to the secondary winding, said apparatus comprising:

a waveform conversion circuit for converting a voltage signal and a current signal that represent a voltage signal and a current signal, respectively, of the primary winding into generally squarewave voltage and current signals, respectively, having a first DC offset voltage and a second DC offset voltage, respectively;

a phase detector circuit for outputting a control signal having a first state when the generally squarewave voltage and current signals are substantially in phase and a second state when there is a difference in phase between the generally squarewave voltage and current signals that is greater than a predetermined phase difference; and a filter for filtering the control signal outputted by said phase detector circuit.

2. The apparatus according to claim 1, wherein said phase detector circuit includes a XOR gate having a first input for receiving the generally squarewave voltage waveform and a second input for receiving the generally squarewave current waveform.

3. The apparatus according to claim 1, wherein filter a R-C filter.

4. The apparatus of claim 1, wherein said waveform conversion circuit includes:

a resistor and a diode for providing the DC offset voltage to the received voltage signal.

5. The apparatus of claim 1, wherein said waveform conversion circuit includes:

a resistor and a diode for providing the DC offset voltage to the received current signal.

6. The apparatus of claim 1, wherein said waveform conversion circuit includes:

a capacitor and a pair of resistors configured in a T network for receiving the voltage signal.

7. The apparatus of claim 6, wherein said waveform conversion circuit further includes a comparator having a first input and a second input, said first input of said comparator in electrical communication with said T network.

8. The apparatus of claim 7, wherein a bias voltage is applied to said second input of said comparator.

9. The apparatus of claim 1, wherein said waveform conversion circuit includes:

a capacitor and a pair of resistors configured in a T network for receiving the current signal.

10. The apparatus of claim 9, wherein said waveform conversion circuit further includes a comparator having a first input and a second input, said first input of said comparator in electrical communication with said T network.

11. The apparatus of claim 10, wherein a bias voltage is applied to said second input of said comparator.

12. An apparatus for detecting a short in a lighting system that receives power from a transformer having a primary winding and a second winding, the lighting system being connected to the secondary winding, said apparatus comprising:

means for converting a voltage signal and a current signal that represent the transformer primary winding voltage and current signals respectively, into generally squarewave voltage and current signals, respectively, having a first DC offset voltage and a second DC offset voltage, respectively;

means for outputting a control signal having a first state when the generally squarewave voltage and current signals are substantially in phase and a second state when there is a difference in phase between the generally squarewave voltage and current signals that is greater than a predetermined phase difference; and means for filtering the control signal outputted by said phase detector circuit.

13. A method for detecting a short in a load which receives power from a transformer that has a primary winding and a second winding, the load being connected to the secondary winding, said method comprising:

providing voltage and current signals that represent the voltage and current signals, respectively, of the transformer primary winding;

converting the provided voltage and current signals into generally squarewave voltage and current signals, respectively, having a first DC offset voltage and a second DC offset voltage, respectively;

generating a control signal having a first state when the generally squarewave voltage and current signals are substantially in phase and a second state when there is a difference in phase between the generally squarewave voltage and current signals that is greater than a predetermined phase difference; and filtering the control signal.

14. The method according to claim 13, wherein the control signal having the second state indicates a short exist in the load.

15. The method according to claim 13, further comprising:

deactivating the load when the control signal has the second state.

* * * * *